United States Patent
Nguyen et al.

(10) Patent No.: US 12,001,736 B1
(45) Date of Patent: Jun. 4, 2024

(54) SYSTEM AND METHOD FOR PROVIDING ALTERNATIVE AUTHENTICATION MODES IN MULTIFUNCTION PERIPHERALS

(71) Applicant: TOSHIBA TEC KABUSHIKI KAISHA, Tokyo (JP)

(72) Inventors: Christopher Nguyen, Huntington Beach, CA (US); William Su, Riverside, CA (US)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/122,598

(22) Filed: Mar. 16, 2023

(51) Int. Cl.
G06F 3/12 (2006.01)

(52) U.S. Cl.
CPC .......... G06F 3/1238 (2013.01); G06F 3/1203 (2013.01); G06F 3/1288 (2013.01)

(58) Field of Classification Search
CPC ............ G06F 21/31; G06F 2221/2117; G06F 2221/2133; G06F 21/6218; G06F 2221/2149; G06F 21/33; G06F 21/629; G06F 21/53; G06F 2209/541; G06F 9/5077; G06F 9/54; G06F 21/575; G06F 16/748; G06F 2221/2115; G06F 3/1415; G06F 3/1438; G06F 3/1462; G06F 9/45533; G06F 9/485; G06F 9/5027; G06F 9/5055; G06F 9/5088; G06F 21/62; G06F 21/305; G06F 21/34; G06F 9/452; G06F 21/45; G06F 21/604; G06F 21/78; G06F 9/45558; G06F 21/64; G06F 2221/2141; G06F 16/188; G06F 16/211; G06F 16/214; G06F 16/2246; G06F 16/278; G06F 16/282; G06F 2009/45587; G06F 16/184; G06F 16/273; G06F 2009/45562; G06F 2009/4557; G06F 2009/45575; G06F 9/5005; G06F 15/16; G06F 15/76; G06F 16/24578; G06F 16/2471; G06F 16/254; G06F 16/258; G06F 16/383; G06F 16/9027; G06F 2009/45595; G06F 21/316; G06F 21/36; G06F 21/40; G06F 21/577; G06F 21/6227;
(Continued)

(56) References Cited

U.S. PATENT DOCUMENTS

| | | | | |
|---|---|---|---|---|
| 8,976,384 | B1* | 3/2015 | Marquardt | G06K 15/4095 358/1.14 |
| 9,300,671 | B1* | 3/2016 | Barak | H04L 63/10 |
| 9,787,875 | B2* | 10/2017 | To | H04N 1/00477 |
| 11,010,810 | B1* | 5/2021 | Pylant | G16H 10/60 |
| 11,741,488 | B1* | 8/2023 | Nguyen | G06Q 30/0273 358/1.15 |
| 2004/0167984 | A1* | 8/2004 | Herrmann | H04L 63/20 709/229 |
| 2007/0279677 | A1* | 12/2007 | Su | G06F 3/1222 358/1.15 |

(Continued)

*Primary Examiner* — Negussie Worku
(74) *Attorney, Agent, or Firm* — UB Greensfelder LLP; John X. Garred

(57) ABSTRACT

A system and method for providing alternative authentication modes in multifunction peripherals includes supplying mobile device management and application authentication to multifunction peripherals without such capabilities. A pluggable authorization module is installed on an incompatible multifunction peripheral by providing a user login on a devices idle screen with an login URL. A user's login credentials are verified by an authentication server that returns an associated username and access permissions once verified. This information is used by the pluggable authorization module to generate a temporary multi-function device services user supplied with the retrieved access permissions. The user can then use the multifunction device services via the temporary user. The temporary user is deleted once the user logs out.

19 Claims, 5 Drawing Sheets

(58) Field of Classification Search
CPC ......... G06F 21/6254; G06F 2221/2143; G06F 3/0622; G06F 3/0643; G06F 3/067; G06F 21/602; G06F 21/82; G06F 2221/2103; G06F 3/0484; G06Q 30/0277; G06Q 30/02; G06Q 10/06; H04L 2463/082; H04L 63/08; H04L 63/0861; H04W 12/069; H04W 12/08; H04W 12/068; H04W 12/10; H04W 12/108; H04W 12/37; H04W 12/60; H04W 12/06; H04W 12/086; H04W 12/088; H04W 12/40; H04W 12/48; H04W 84/12; H04W 88/12; G09G 2354/00; G09G 2370/16; G09G 2370/22; G09G 5/006; G09G 5/14; G06K 19/06037
USPC ........................................................ 358/1.15
See application file for complete search history.

(56) References Cited

U.S. PATENT DOCUMENTS

| | | | |
|---|---|---|---|
| 2011/0265172 A1* | 10/2011 | Sharma | H04L 63/0815 726/8 |
| 2013/0342866 A1* | 12/2013 | Hansen | H04N 1/4433 358/1.14 |
| 2015/0178608 A1* | 6/2015 | Marquardt | G06F 3/1222 358/1.14 |
| 2015/0178609 A1* | 6/2015 | Marquardt | G06F 3/1259 358/1.14 |
| 2016/0344730 A1* | 11/2016 | Holz | H04L 63/0876 |
| 2018/0007049 A1* | 1/2018 | Palki | G06F 21/31 |
| 2019/0312884 A1* | 10/2019 | Vinukonda | H04L 65/612 |
| 2023/0017293 A1* | 1/2023 | Su | G06F 9/542 |

* cited by examiner

SYSTEM AND METHOD FOR PROVIDING ALTERNATIVE AUTHENTICATION MODES IN MULTIFUNCTION PERIPHERALS

TECHNICAL FIELD OF THE INVENTION

This application relates generally to printing.

BACKGROUND OF THE INVENTION

Document processing devices include printers, copiers, scanners and e-mail gateways. More recently, devices employing two or more of these functions are found in office environments. These devices are referred to as multifunction peripherals (MFPs) or multifunction devices (MFDs). As used herein, MFPs are understood to comprise printers, alone or in combination with other of the afore-noted functions. It is further understood that any suitable document processing device can be used.

Businesses often maintain fleets of networked MFPs. Often times this includes devices with different capabilities and devices from different manufacturers. Many MFP networks require user authentication for device access. This may be determined by a user login with a username and password or PIN. It can be problematic when a common authorization protocol is not available, or if a desired protocol is unavailable on a particular device.

BRIEF DESCRIPTION OF THE DRAWINGS

Various embodiments will become better understood with regard to the following description, appended claims and accompanying drawings wherein:

DETAILED DESCRIPTION OF THE INVENTION

Figure 1:
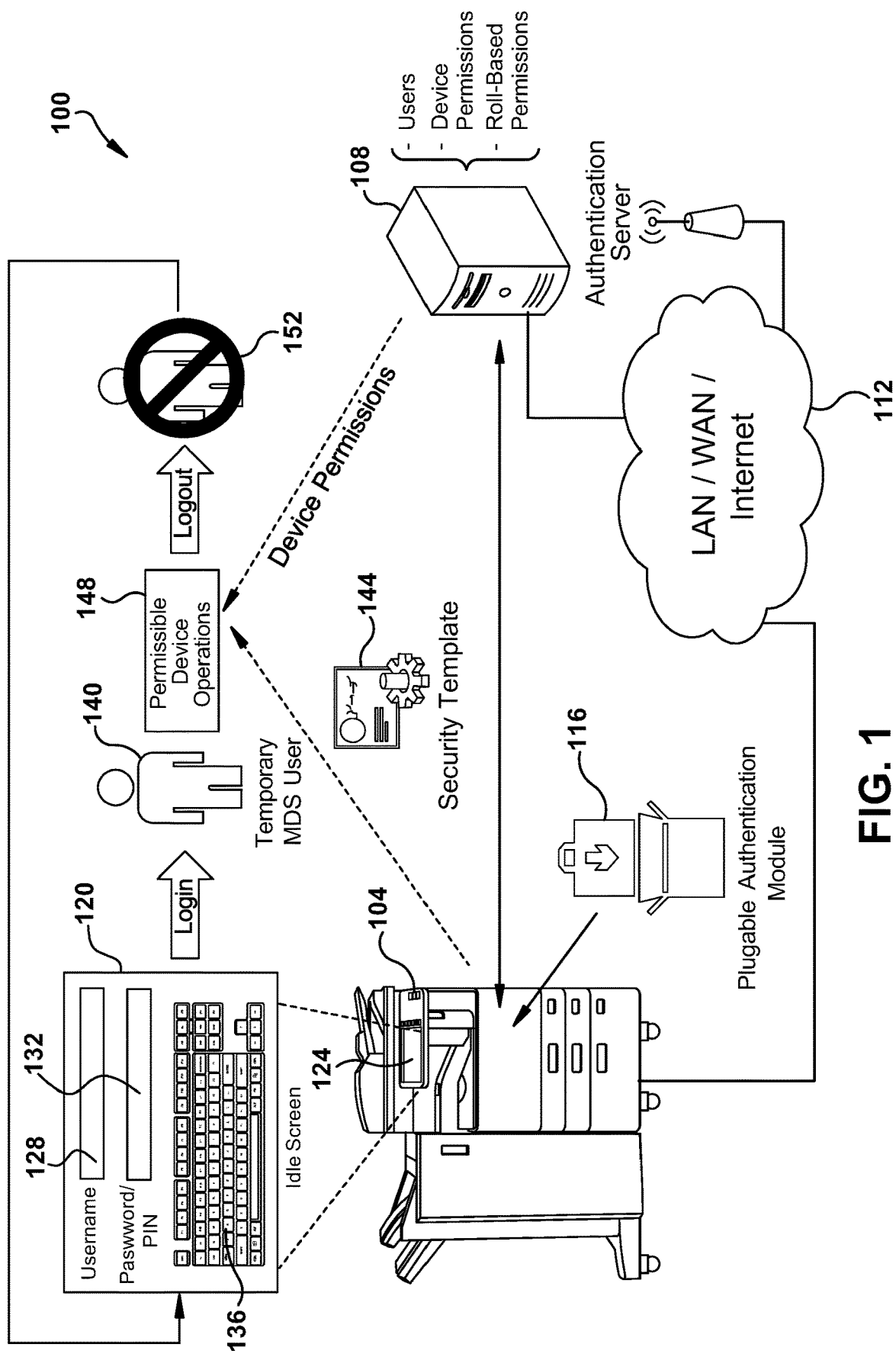
FIG. 1 is an example embodiment of a system for providing alternative authentication modes in multifunction peripherals.

The systems and methods disclosed herein are described in detail by way of examples and with reference to the figures. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

MFPs from Toshiba TEC include two authentication protocols, MDS and "application authorization." MDS authentication mode stands for "Multi-Function Device Services" authentication mode. It is a feature that allows an external authentication server, such as Active Directory or LDAP, to control the authentication process for users trying to access the Toshiba MFP. With MDS authentication mode, a user's credentials are verified by the external authentication server before the user is allowed access to the MFP. This can help to improve security by ensuring that only authorized users are able to use the device, and by allowing administrators to manage user access and permissions centrally through the authentication server.

Application authentication mode, on the other hand, is another authentication mode offered by Toshiba MFPs that allows individual applications running on the MFP, such as scan-to-email or scan-to-folder, to require separate authentication. This can be useful in situations where different users need access to different applications on the MFP, or when additional security is required for certain applications.

In summary, MDS authentication mode and Application Authentication mode are two external authentication methods offered by Toshiba MFPs that allow an external authentication server to control the authentication process for users, providing increased security and centralized management of user access and permissions.

Pluggable Authentication Modules (PAM) can be used in operating systems, such as in Unix-like operating systems, to manage the authentication of users. PAM can provide a flexible and modular framework for authentication, allowing system administrators to choose different authentication methods for different services or applications.

PAM works by providing a set of APIs (Application Programming Interfaces) that allow applications and services to authenticate users using different methods, such as passwords, biometric data, smart cards, or token-based authentication. PAM is a dynamic library that is loaded by applications or services when they need to authenticate a user, and it determines which authentication modules to use based on the configuration files.

When an application or service needs to authenticate a user, it calls the PAM API, which then reads the configuration file to determine which authentication modules to use. The authentication modules can be stacked, and each module is responsible for a specific aspect of the authentication process, such as verifying the user's password, checking if the user has the correct permissions, or using two-factor authentication.

Each authentication module returns a result to the PAM API, which determines whether the user is authenticated or not based on the configuration file. If the user is authenticated, the application or service can proceed with its normal operations, but if the user is not authenticated, the PAM API will deny access to the application or service.

The modular design of PAM allows system administrators to choose which authentication methods to use, and it makes it easy to add or remove authentication modules without modifying the applications or services themselves. This makes it a flexible and powerful tool for managing authentication in Unix-like operating systems.

Certain devices, such as MFPs provided by Toshiba TEC, offer authentication by MDS and by application authentication, providing users with the advantages of these protocols. With MDS and application authentication mode, an external authentication server controls the authentication process. External authentication uses an authentication server to decide whether a user should be allowed access to a MFP, and often what level of access an authenticated user enjoys on a MFP.

To use MDS or application authentication mode, a login URL, points to a single sign on authentication login page. Devices from Lexmark, and others, do not offer MDS and application authentication mode. It would be difficult or unlikely, if not impossible, to have every device manufacture build these authentication protocols into their devices. However, MFP networks often mix devices from multiple sources.

Example embodiments herein provide a PAM that can be installed on MFPs, such as Lexmark devices that do not support MDS or Application Authentication modes. Once installed, users can use the MFP in MDS or Application Authentication mode. The PAM integrates multiple low-level authentication schemes into a high-level application programming API.

To authenticate a user, the PAM may prompt the user. The PAM utilizes an MFP idle screen profile to control security on the front panel of an MFP. Idle screen profile shows up when an MFP is in a logged out state, such as before showing the welcome screen. Idle screens are generally easy to customize, and utilizing them allows for engrafting functionality without rewriting device code.

After a user logs in, the PAM creates a temporary MDS user. By default, all device menus, settings, and functions have security disabled. Access control disables or manages access to specific printer menus and functions. This can be set by the PAM using a security template. Depending on the type of device, the number of functions that can be controlled will vary.

Some scenarios only require limited security, such as PIN-protected access to commonly used device functions. Other scenarios require tighter security and role-based restrictions. To accommodate users in different groups who need access to a common set of functions, such as printing, copying, and faxing, the PAM gets information from the authentication server and combines these components to suit users' needs, while restricting other functions to authorized users only.

FIG. 1 illustrates an example embodiment of a system 100 for providing alternative authentication modes in multifunction peripherals. In the illustrated example, MFP 104 lacks desired authentication protocols, such as MDS or application authentication. MFP 104 is in data communication with authentication server 108 via network cloud 112. Network cloud 112 is suitably comprised of a local area network (LAN), a wide area network (WAN), which may comprise the Internet, or any suitable combination thereof. Network cloud 112 is comprised of any suitable wireless or wired data connection or combination thereof.

PAM 116 is installed on MFP 104 and generates a login screen 120 on MFP touchscreen display 124 when the MFP is in idle mode. Login screen prompts a user for a username 128 and password or PIN 132, suitably with a data entry accomplished via soft keyboard 136. Received login credentials are verified by authentication server 108, and once verified, the server returns an associated username and the user's device permissions. PAM 116 then creates temporary MDS user 140, providing the MDS user with the device permissions received from authentication server 108. These permissions, coupled with any constraints provided by security template, set permissible device operations for temporary MDS user 140. Permissible operations are completed at block 148, after which the user logs out. After logout, temporary MDS user 140 is deleted at 152, and the PAM returns to regenerate login screen 120 during the next device idle period to accommodate the next user.

Figure 2:
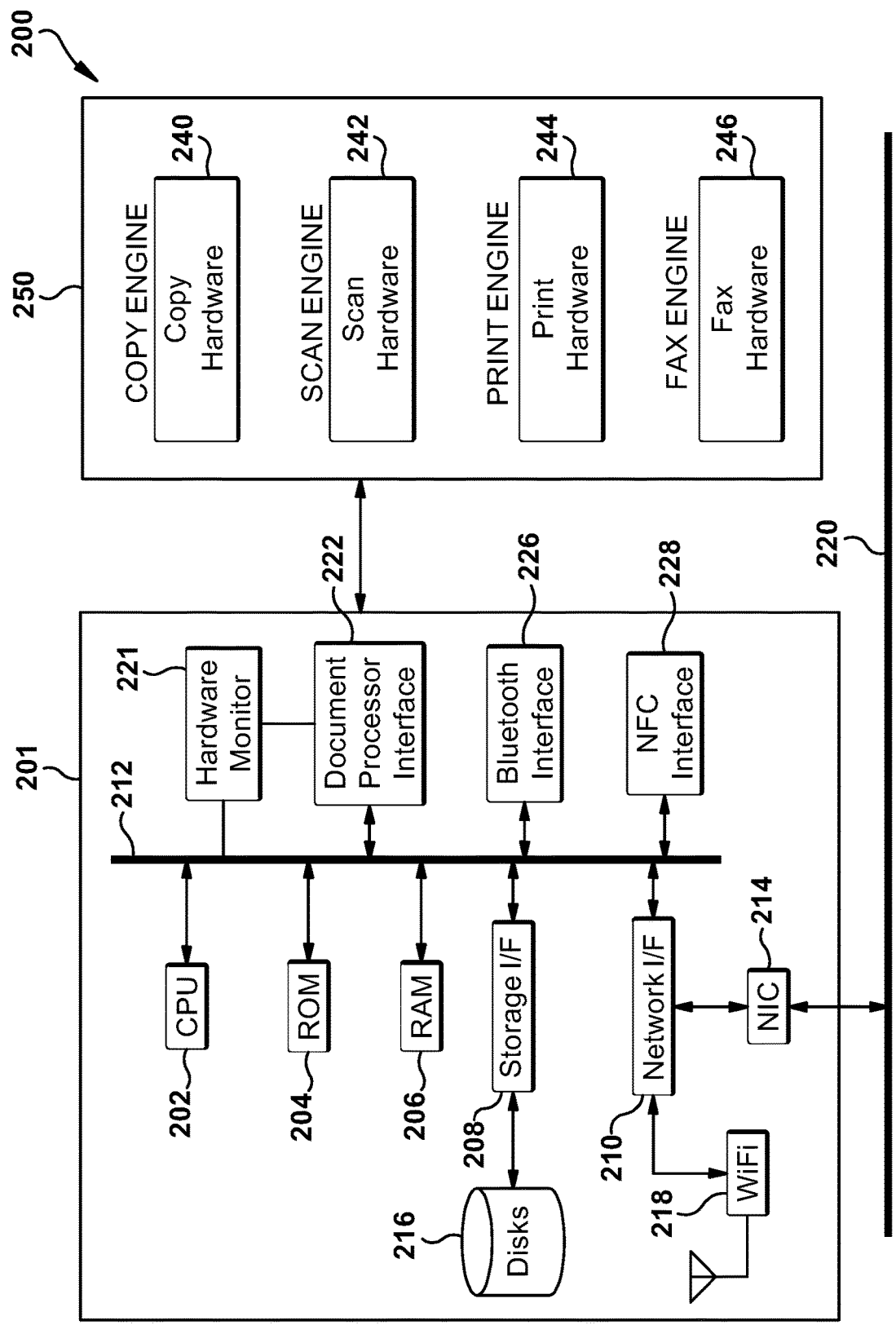
FIG. 2 is an example embodiment of a networked digital device, such as multifunction peripheral.

Turning now to FIG. 2, illustrated is an example embodiment of a networked digital device comprised of document rendering system 200 suitably comprised within an MFP, such as with MFP 104 of FIG. 1. It will be appreciated that an MFP includes an intelligent controller 201 which is itself a computer system. Thus, an MFP can itself function as a server with the capabilities described herein. Included in intelligent controller 201 are one or more processors, such as that illustrated by processor (CPU) 202. Each processor is suitably associated with non-volatile memory, such as read-only memory (ROM) 204, and random access memory (RAM) 206, via a data bus 212.

Processor 202 is also in data communication with input/output interface 222, suitably comprising a user touchscreen. While touchscreens are discussed in example embodiments herein, it is to be appreciated that any suitable user interface, such as keyboards, switches, displays, trackballs or mice may be used.

Processor 202 is also in data communication with a storage interface 208 for reading or writing to a storage 216, suitably comprised of a hard disk, optical disk, solid-state disk, cloud-based storage, or any other suitable data storage as will be appreciated by one of ordinary skill in the art.

Processor 202 is also in data communication with additional interfaces, such as Bluetooth interface 226 and NFC interface 228.

Processor 202 is also in data communication with a network interface 210 which provides an interface to a network interface controller (NIC) 214, which in turn provides a data path to any suitable wired interface or physical network connection 220, or to a wireless data connection via wireless network interface 218. Example wireless network interfaces include optical, cellular, Wi-Fi, wireless universal serial bus (wireless USB), satellite, and the like. Example wired interfaces include Ethernet, USB, IEEE 1394 (FireWire), Lightning, telephone line, or the like.

Processor 202 can also be in data communication with any suitable user input/output (I/O) which provides data communication for interfacing with user peripherals, such as displays, keyboards, mice, track balls, touch screens, or the like. Processor 202 can also be in communication with hardware monitor 221, such as a page counter, temperature sensor, toner or ink level sensor, paper level sensor, or the like.

Also in data communication with data bus 212 is a document processor interface 222 suitable for data communication with the document rendering system 250, including MFP functional units. In the illustrated example, these units include a copy engine comprising copy hardware 240, a scan engine comprise of scan hardware 242, a print engine comprised of print hardware 244 and a fax engine comprised of fax hardware 246 which together comprise document rendering system 250. It will be understood that functional units are suitably comprised of intelligent units, including any suitable hardware or software platform.

Figure 3:
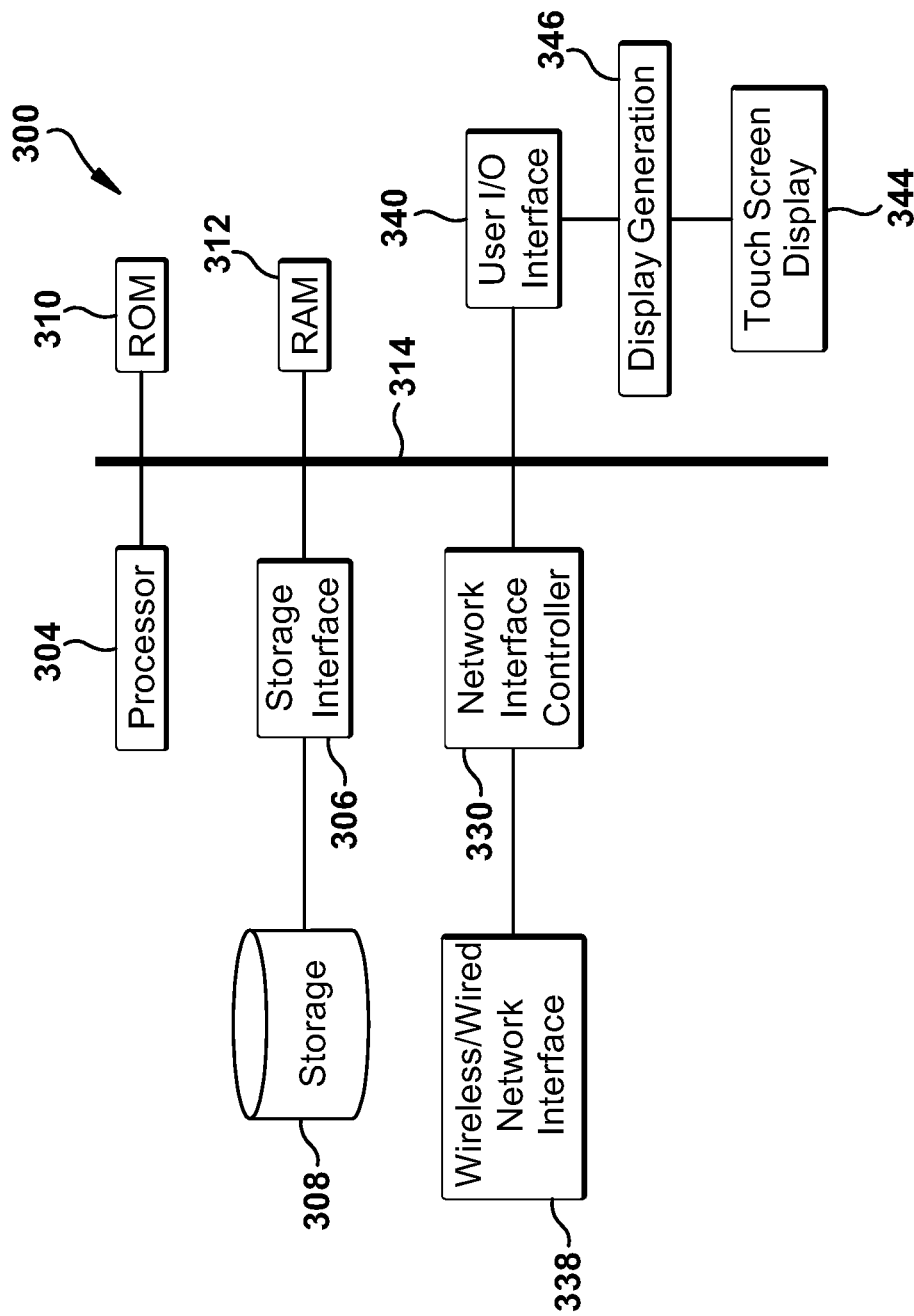
FIG. 3 is an example embodiment of a digital device system, such as a server.

Turning now to FIG. 3, illustrated is an example embodiment of a digital data processing device 300 such as authentication server 108 of FIG. 1. It is to be appreciated that some components listed may be unnecessary in certain configurations. Components of the digital data processing device 300 suitably include one or more processors, illustrated by processor 304, memory, suitably comprised of read-only memory 310 and random access memory 312, and bulk or other non-volatile storage 308, suitably connected via a storage interface 306. Data communication among components is accomplished via data bus 314. A network interface controller 330 suitably provides a gateway for data communication with other devices, via any wireless or wired connection, such as via wireless network interface 338. A user input/output interface 340 is suitably comprised of display generator 346 interfacing with touchscreen display 344. As noted above, any suitable user input and display can be used. User input/output interface 340 also provides connection to biometric sensor 348, suitably comprised of a fingerprint sensor, retinal sensor, or the like, and may be used to secure device access to one or more users. Processor 304 processor is also in data communication with a digital camera 352, suitably used to capture images which may include encoded images such as barcodes or QR codes. Digital camera 352 is also suitably used for facial recognition, including facial recognition for securing device access.

Figure 4:
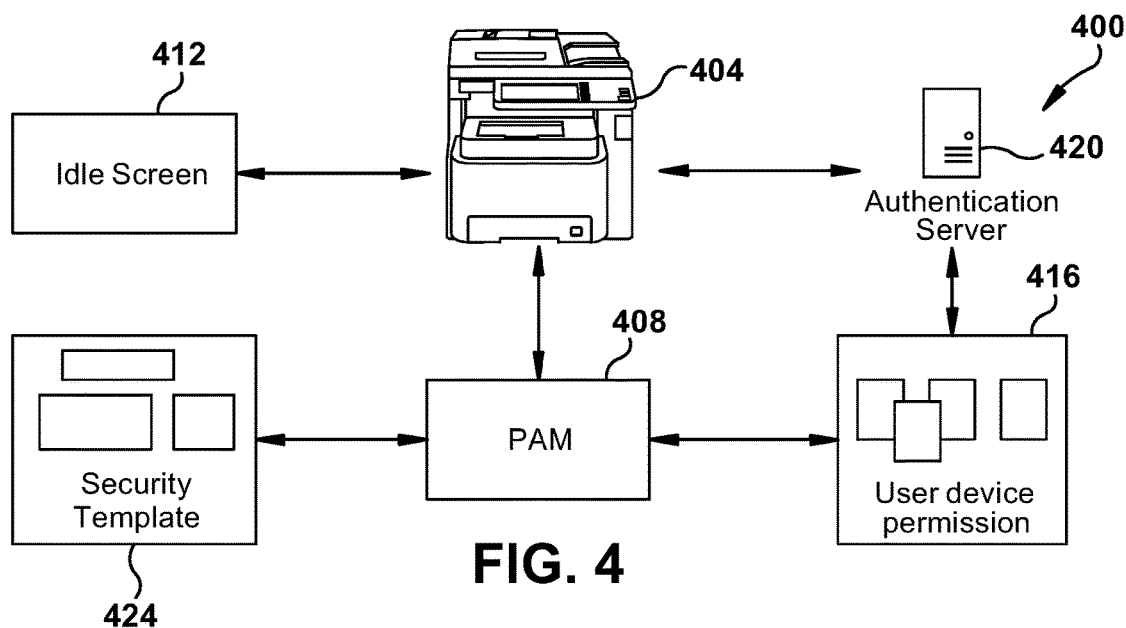
FIG. 4 is a system overview diagram of an example embodiment of a system for providing alternative authentication modes in multifunction peripherals.

FIG. 4 illustrates a system overview diagram 400 of an example embodiment of a system for providing alternative authentication modes in multifunction peripherals. MFP 404 operates on installed PAM to generate idle screen 412. PAM 408 controls user access in connection with user device permission 416 obtained from authentication server 420, along with application of a security template 424.

Figure 5:
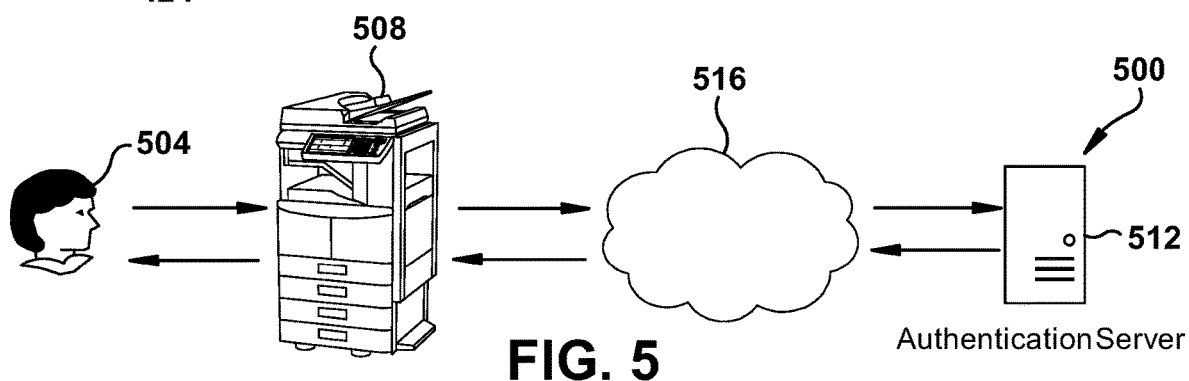
FIG. 5 is a hardware module block diagram of an example embodiment of a system for providing alternative authentication modes in multifunction peripherals.

FIG. 5 illustrates a hardware module block diagram 500 of an example embodiment of a system for providing alternative authentication modes in multifunction peripherals. User 504 interacts with MFP 508, which is in data communication with authentication server 512 via network cloud 516.

Figure 6:
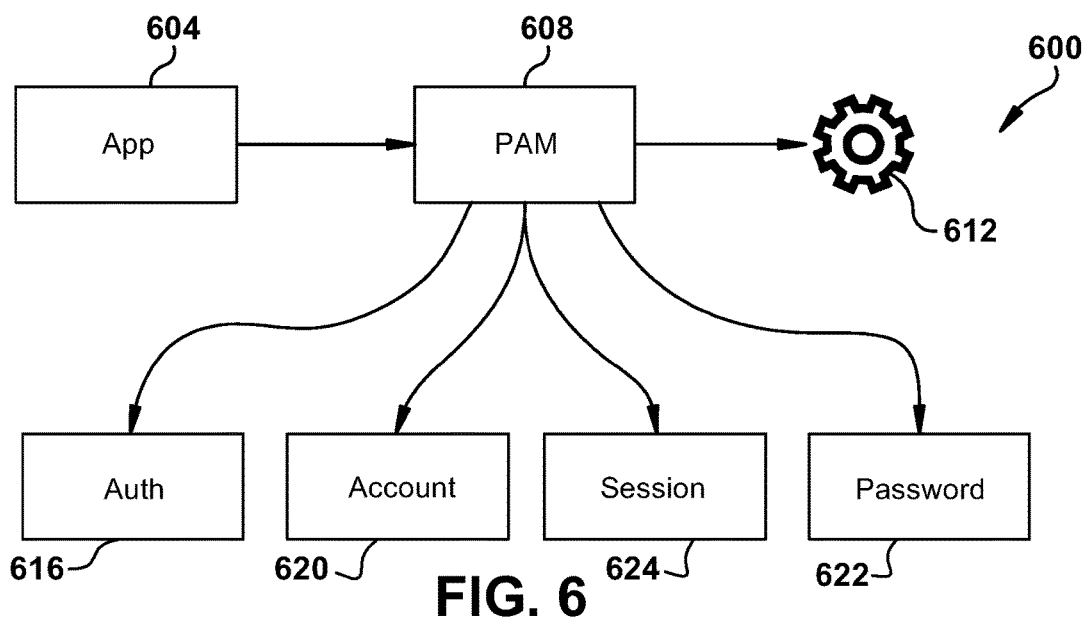
FIG. 6 is a software module block diagram of an example embodiment of a system for providing alternative authentication modes in multifunction peripherals.

FIG. 6 illustrates a software module block diagram 600 of an example embodiment of a system for providing alternative authentication modes in multifunction peripherals. App 604 is used to generate PAM 608 which is installed in a device at 612. PAM 608 functions to provide authentication 616, accounting 620, such as quota or cost accounting, session control 624 and password control 622.

Figure 7:
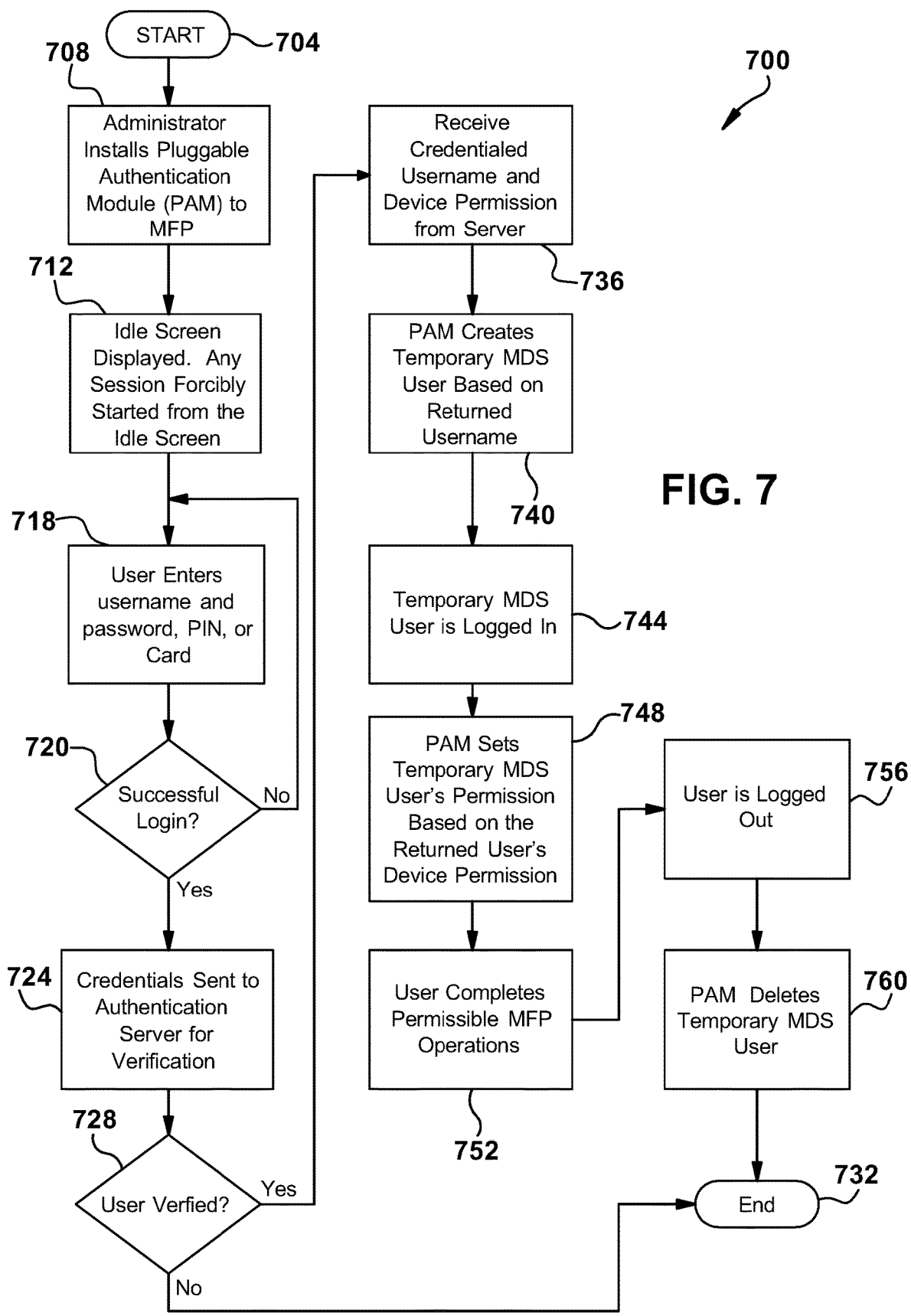
FIG. 7 is a flowchart of an example embodiment of a system for providing alternative authentication modes in multifunction peripherals.

FIG. 7 illustrates flowchart 700 of an example embodiment of a system for providing alternative authentication modes in multifunction peripherals. The system commences at block 704 and proceeds to block 708 where an administrator installs a PAM into an MFP. The PAM generates an idle screen at block 712, allowing a user to enter their username and password or PIN at block 718. If login is unsuccessful at block 720, the system returns to block 718. If login is successful, the user's credentials are sent to an authentication server at block 724 for verification. If the user is not verified, the system ends at block 732.

When a user is verified, the system proceeds to block 736 wherein a credentialed username and device permissions associated with the logged in user are received from the authentication server. The PAM then creates a temporary MDS based on the returned username at block 740 and the temporary MDS is logged in at block 744. Next, the PAM sets the temporary MDS user's permission based on the returned user device permission at block 748. Such permissions are also suitably decided in connection with a security template. The user completes permissible device operations at block 752, then logs out at block 756. Upon logout, the PAM deletes the temporary MDS user at block 760 and the system ends at block 732.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A system multifunction peripheral comprising:
a processor;
a network interface;
a user interface; and
memory storing a pluggable authentication module configured to cause the processor to display a login prompt on the user interface,
receive, from a user, user login information responsive to the displayed login prompt via the user interface,
send the user login information to an associated authentication server via the network interface,
receive a credentialed username and its associated device permission from the associated authentication server via the network interface,
create a temporary user based on the credentialed username and device permission,
log the temporary user into a multifunction peripheral, and
enable services in the multifunction peripheral in accordance with the device permission.

2. The system of claim 1 wherein the pluggable authentication module is further configured to cause the processor to logout the user and delete the temporary user.

3. The system of claim 2 wherein the user further comprises an application authentication mode user.

4. The system of claim 2 further comprising one or more of a scan engine, a print engine, a copy engine and a fax engine selectively operable by the user in accordance with the assigned device permission.

5. The system of claim 4 wherein the pluggable authentication module is further configured to display the login prompt when the system is in an idle mode.

6. The system of claim 4 wherein the system comprises a multifunction peripheral.

7. The system of claim 4 further comprising a security template configured to limit one or more device features specified in the assigned device permission.

8. The system of claim 7 wherein the one or more device features is comprised of one or more of device functions, device settings and display menus.

9. A method comprising:
storing a pluggable authentication module in a memory;
displaying a login prompt on a user interface in accordance with operation of the pluggable authentication module;
receiving, from a user, user login information responsive to the displayed login prompt via the user interface;
sending the user login information to an associated authentication server via a network interface;
receiving a credentialed username and its associated device permission for the user from the associated authentication server via the network interface;
creating a temporary device user based on the credentialed username and device permission;
logging the temporary device user into a multifunction peripheral; and
enabling services in the multifunction peripheral in accordance with the device permission.

10. The method of claim 9 deleting the temporary user responsive to a logout of the user.

11. The method of claim 10 wherein the user further comprises an application authentication mode user.

12. The method of claim 10 further comprising selectively enabling one or more of a scan operation, a copy operation, a print operation and a fax operation by the user in accordance with the assigned device permission.

13. The method of claim 12 wherein the pluggable authentication module is further configured to display the login prompt when the system is in an idle mode.

14. The method of claim 12 further comprising limiting one or more device features as specified in the assigned device permission in accordance with a security template.

15. The method of claim 14 wherein the one or more device features is comprised of one or more of device functions, device settings and display menus.

16. The method of claim 12 further comprising installing the pluggable authentication module on a multifunction peripheral.

17. A method comprising:
   placing a multifunction peripheral in idle mode;
   showing a login prompt on a touchscreen display of the multifunction peripheral during the idle mode;
   receiving user login information from a user responsive to the login prompt via the touchscreen display;
   sending received user login information to an authentication server via a network interface;
   receiving a username and device permission associated with the user from the authentication server; and
   creating a temporary user in accordance with the received username and device permission;
   logging the temporary user into the multifunction peripheral;
   controlling access to one or more features of the multifunction peripheral in accordance with the device permission.

18. The method of claim 17 further comprising logging out the user and deleting the temporary user responsive thereto.

19. The method of claim 18 further comprising showing the login prompt on the touchscreen display in accordance with an instruction received from a pluggable authentication module.

* * * * *